United States Patent [19]

Ogawa et al.

[11] 4,071,654
[45] Jan. 31, 1978

[54] MAGNETIC RECORDING MEMBER

[75] Inventors: Hiroshi Ogawa; Kazuhide Ishii; Matsuaki Nakamura; Yasuo Tamai; Goro Akashi, all of Odawara, Japan

[73] Assignee: Fuji Photo Film Co., Ltd., Minami-ashigara, Japan

[21] Appl. No.: 608,500

[22] Filed: Aug. 28, 1975

[30] Foreign Application Priority Data

Aug. 28, 1974 Japan .................................. 49-98468

[51] Int. Cl.$^2$ .............................................. G11B 5/78
[52] U.S. Cl. .................................. 428/336; 360/134; 427/129; 428/337; 428/339; 428/409; 428/539; 428/900
[58] Field of Search ............... 428/900, 409, 339, 164, 428/336, 337, 539; 427/129; 360/134

[56] References Cited

U.S. PATENT DOCUMENTS

| | | | |
|---|---|---|---|
| 3,255,307 | 6/1966 | Schuller | 360/134 |
| 3,442,683 | 5/1969 | Lenoble et al. | 427/129 |
| 3,734,772 | 5/1973 | Schnell et al. | 360/134 |
| 3,881,046 | 4/1975 | Akashi et al. | 428/900 |
| 3,922,439 | 11/1975 | Hartmann et al. | 428/900 |
| 3,967,025 | 6/1976 | Tanabe et al. | 360/134 |

*Primary Examiner*—George F. Lesmes
*Assistant Examiner*—Stanley S. Silverman
*Attorney, Agent, or Firm*—Sughrue, Rothwell, Mion, Zinn and Macpeak

[57] ABSTRACT

A magnetic recording material comprising a non-magnetic flexible support having thereon a magnetic recording layer comprising a ferromagnetic powder dispersed in a binder, the surface of the non-magnetic flexible support having the magnetic recording layer thereon satisfying an S-factor expressed by the following relationship (I-1)

$$S_1 \leq \frac{d + 1.15}{15} \quad \text{(I-1)}$$

wherein $S_1$ is the surface roughness in $\mu m$ of the surface of the non-magnetic flexible support having the magnetic recording layer thereon and $d$ is the thickness in $\mu m$ of the magnetic recording layer, with the thickness (d) of the magnetic recording layer being about 5 $\mu m$ or less, and the back surface of the non-magnetic flexible support opposite that having the magnetic recording layer thereon satisfying an S-factor expressed by the following relationship (I-2)

$$\frac{d + 1.15}{15} < S_2 \leq 0.8 \quad \text{(I-2)}$$

wherein $S_2$ is the surface roughness in $\mu m$ of the back surface of the non-magnetic support opposite that having the magnetic recording layer thereon and $d$ is as described above.

5 Claims, 7 Drawing Figures

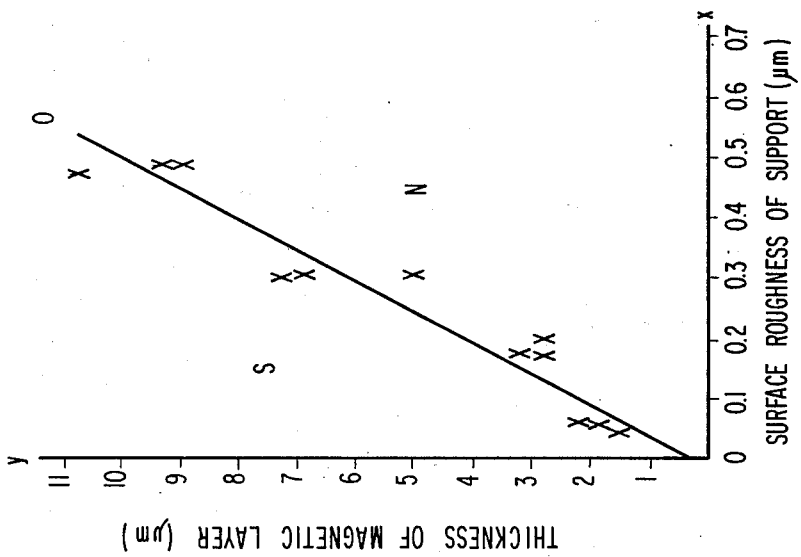
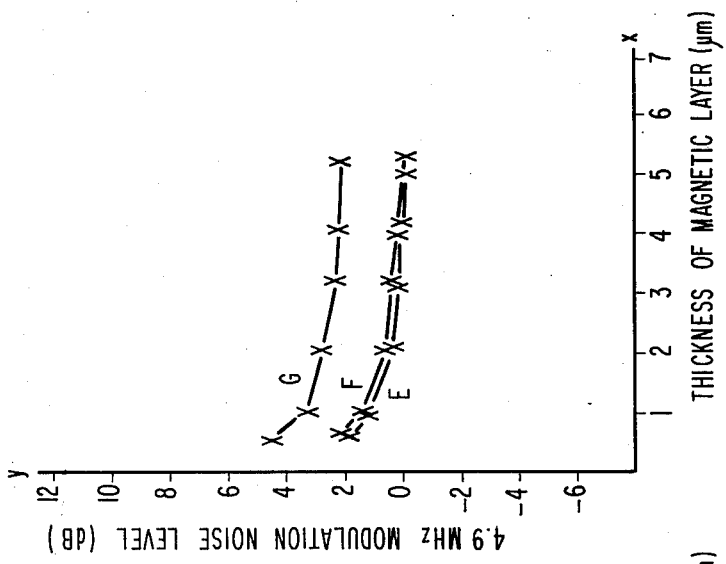
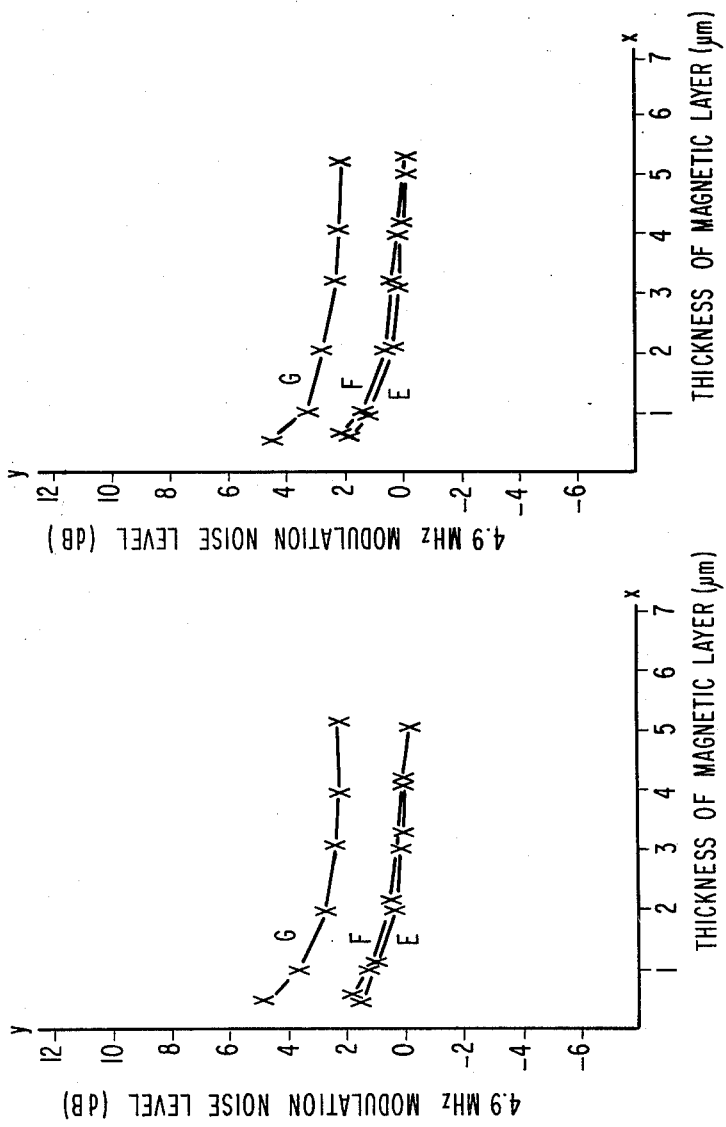

MAGNETIC RECORDING MEMBER

BACKGROUND OF THE INVENTION

1. Field of the Invention

The present invention relates to a magnetic recording member, and more particularly, to a magnetic recording member having excellent surface properties, excellent low-noise properties, and good travelling properties.

2. Description of the Prior Art

Nowadays, various kinds of high density magnetic recording devices are widely used, and among them, a video-recording device is used to record very short wave lengths. In video-recording, therefore, the contact between a magnetic head and a magnetic tape must be good so that the clearance loss between the head and the tape is reduced as much as possible, and thus even a slight unevenness on the surface of the video tape gives rise to various problems.

In order to improve the surface properties of a video tape, heretofore, the addition of binders having good surface properties, surface active agents, or the like, surface-treatments, and so on have been proposed. These methods are described in, for example, Japanese Patent Publication Nos. 14391/1965, 13181/1966, 28045/1972, 28046/1972, 28047/1973, and 5482/1973, and Japanese Patent Application (OPI) Nos. 37904/1972, 45522/1972 and 3506/1973.

Even with these methods, however, the surface properties are deteriorated and the noise level increases as the thickness of the magnetic layer decreases, and thus it has been found that serious practical difficulties are encountered with tapes produced by these methods when they are used as magnetic tapes for short wave length high density recording. This is because when the thickness of the magnetic layer is below a certain limit, the surface properties of the flexible support greatly influence the surface properties of the magnetic layer, that is, the surface properties of the magnetic layer are deteriorated if the surface properties of the flexible support are poor.

In accordance with prior art techniques, therefore, it has been impossible to eliminate the increase in the noise level encountered with a thin magnetic layer, and a good quality tape having a good signal-to-noise ratio (S/N ratio) has not been obtained.

On the other hand, a magnetic tape for high density recording must have good travelling properties. This is because a variation in the travelling causes a change in the sensitivity, a modulation of the signals producing noise, and so on. In order to improve the travelling properties, a layer has often been coated on the back of the tape. Examples of such coated layers are described in Japanese Patent Nos. 2613/1974, 32003/1972, and 10241/1974, and Japanese Patent Application (OPI) No. 17203/1974, etc.

In accordance with these methods, however, the surface properties of the magnetic layer are deteriorated due to the adhesion between the layer coated on the back of the tape and the magnetic layer, and a transfer of the layer coated on the back of the tape. As a result, magnetic tapes with high out-put, low noise, and good travelling properties have not been obtained.

Moreover, a method of matting the surface of the flexible support opposite the surface having the magnetic layer thereon is described in Japanese Patent Publication No. 6859/1966, and Japanese Patent Application (OPI) Nos. 28070/1972 and 97508/1973, etc. However, no suggestion exists in the prior art relative to the surface properties of the surface on which the magnetic layer is to be provided and the effects thereof, and a magnetic recording member with low noise and good travelling properties is not disclosed.

SUMMARY OF THE INVENTION

An object of the present invention is to provide a novel magnetic recording member.

Another object of the present invention is to provide a magnetic recording member having a magnetic layer with excellent surface properties.

A further object of the present invention is to provide a magnetic recording member with a low noise level.

Still another object of the present invention is to provide a magnetic recording member with a good S/N ratio.

Still a further object of the present invention is to provide a magnetic recording member with good travelling properties and a low degree of scattering, stepping and cinching.

These and other objects and advantages of the present invention will become apparent from the following detailed description of the invention.

These objects are attained with a magnetic recording medium comprising a non-magnetic flexible support having thereon a magnetic recording layer comprising a binder and a ferromagnetic powder dispersed therein in which (1) the surface of the non-magnetic flexible support having the magnetic recording layer thereon satisfies an S-factor represented by the relationship (I-1):

$$S_1 \leq \frac{d + 1.15}{15} \qquad (I-1)$$

wherein $S_1$ designates the surface roughness in $\mu m$ of the surface of the non-magnetic flexible support having the magnetic recording layer thereon, and $d$ designates the thickness in $\mu m$ of the magnetic recording layer;

2. the thickness of the magnetic recording layer (d) is about 5 $\mu m$ or less; and 3. the surface roughness of the surface of the non-magnetic flexible support opposite the surface having the magnetic recording layer thereon satisfies an S-factor represented by the relationship (I-2)

$$\frac{d + 1.15}{15} < S_2 \leq 0.8 \qquad (I-2)$$

wherein $S_2$ is the surface roughness in $\mu m$ of the back surface of the non-magnetic support opposite that having the magnetic recording layer thereon and $d$ is as described above.

BRIEF DESCRIPTION OF THE DRAWINGS

FIGS. 1 to 6 indicate the relation between the thickness of the magnetic recording layer of the magnetic recording member of the present invention (X-axis, unit:$\mu m$) and the modulation noise level of 4.9 MHz (Y-axis, unit:dB), in which A, B, C, and D designate magnetic recording members in which flexible supports having a surface roughness of 0.06 $\mu m$, 0.17 $\mu m$, 0.31 $\mu m$, and 0.49 $\mu m$, respectively, are used, and in which E, F, and G designate magnetic recording members in which flexible supports, each having a surface roughness of 0.06 $\mu m$, on the surface on which the magnetic recording layer is provided, and a surface roughness of 0.20 μm, 0.50 μm, and 0.80 μm, respectively, on the opposite surface thereof, are used.

FIG. 7 indicates the minimum magnetic thickness (d, unit:μm) necessary for the modulation noise level to become ± 0 decibel as compared with a standard tape, derived from FIGS. 1 to 3.

DETAILED DESCRIPTION OF THE INVENTION

Conventional video tapes have magnetic recording layers with a thickness ranging from about 5 to about 10 μm. Investigations have been conducted on magnetic tapes having magnetic recording layers with thicknesses of about 5 μm or less as video tapes for high density short wave length recording. As a result, it has been found that where the thickness of the magnetic recording layer on the same support is varied the modulation noise level increases as the thickness of the magnetic layer decreases. As a result of further investigations, it has now been found that the above phenomenon is not caused by the thickness of the magnetic recording layer and the dispersibility of the ferromagnetic powder in the binder, but it is due to the fact that with hitherto used surface processing methods such as calendering, as the thickness of the magnetic recording layer decreases, the smoothness of the surface of the magnetic recording layer is deteriorated due to the influence of the roughness of the surface of the support degrading the contact between the video tape and the magnetic head.

Figure 2:
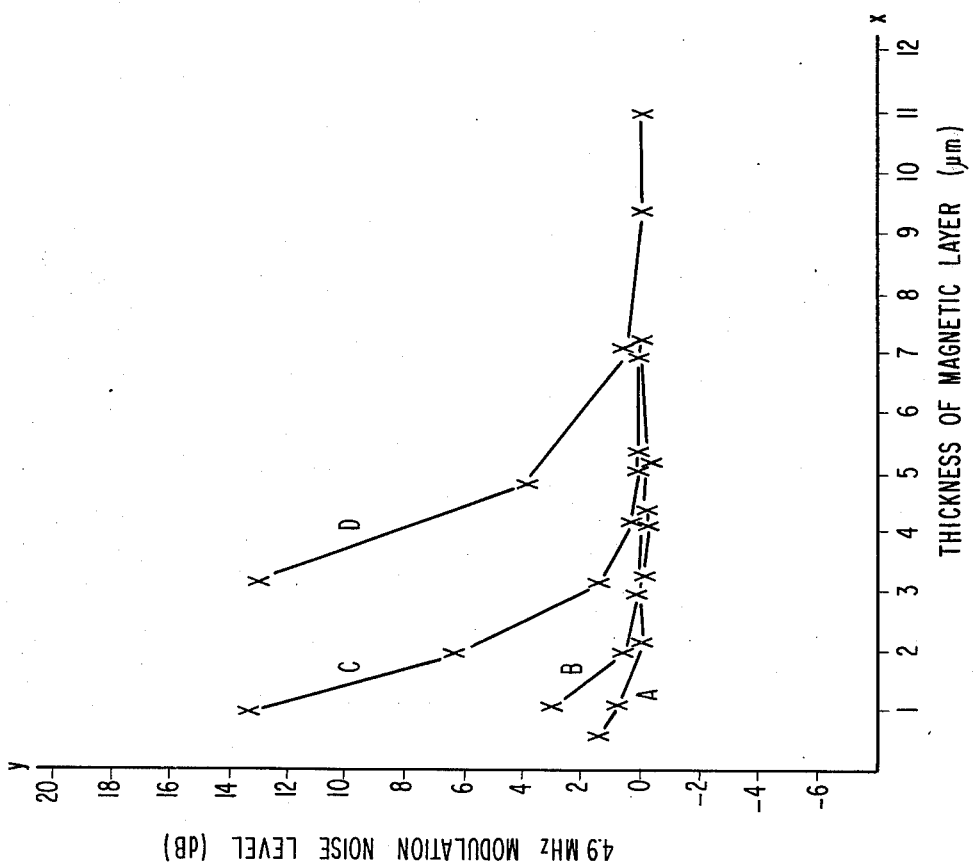
Figure 1:
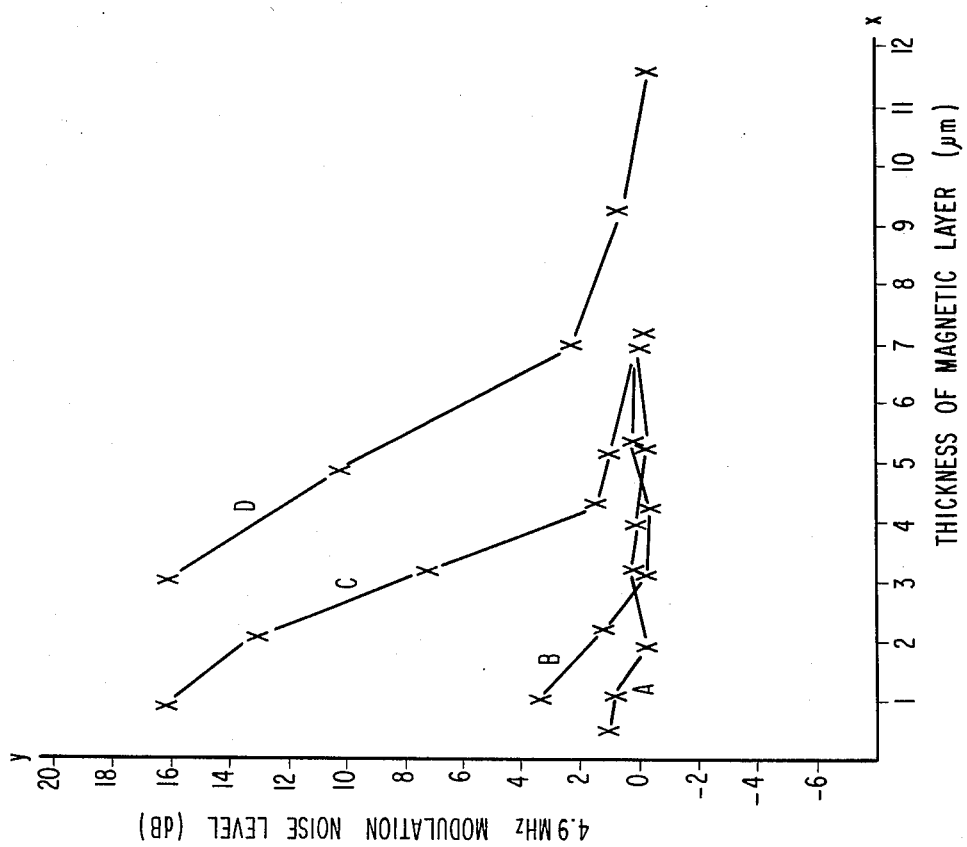
Figure 3:
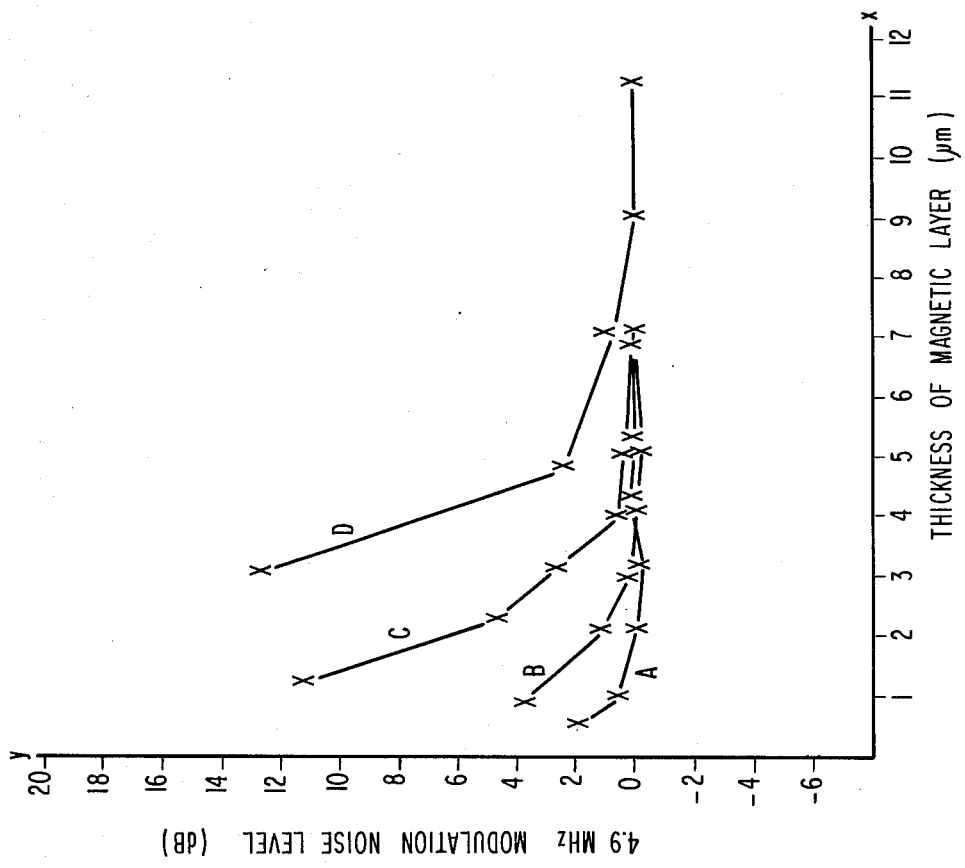

For this reason, video tapes were produced by providing magnetic recording layers having various thicknesses on supports with different surface roughnesses, and the change in the modulation noise level due to the change in the surface roughness of the flexible support and the thickness of the magnetic recording layer was measured. From the results so obtained, it has been found that with supports having the same surface roughness, the modulation noise level increases suddenly when the thickness of the magnetic recording layer become less than a certain thickness, as shown in FIGS. 1 to 3.

Figure 4:
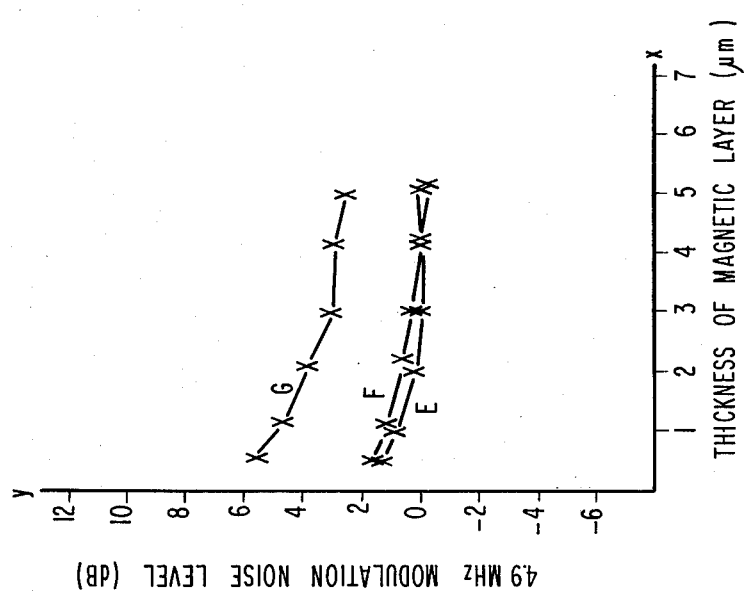

Furthermore, video tapes were produced by providing magnetic recording layers with various thicknesses on flexible supports wherein the surface, on which the magnetic recording layers were provided, had different surface properties from the other surfaces, i.e., the surface having the magnetic recording layer thereon, was smooth and the other surface was a matted surface. With the video tapes so produced, the change in the modulation noise level due to the change in the surface properties of the surface of the flexible support having the magnetic recording layer thereon, and due to the change in the thickness of the magnetic recording layer was measured. From the results so obtained, it has been found that even though the surface properties of the surface of the flexible support having the magnetic recording layer thereon are good, if the surface roughness of the opposite surface of the flexible support is 0.5 μm or more, a transfer onto the magnetic recording layer takes place, thereby resulting in a increase in noise, as shown in FIGS. 4 to 6.

From the above results, it can be understood that those magnetic recording members comprising supports and magnetic recording layers, where the surface roughness of the surface of the support having the magnetic recording layer thereon, and the thickness of the magnetic recording layer fall within the area A shown in FIG. 5, have low noise level.

Thus it has been found that assuming that the thickness in μm of the magnetic recording layer is $d$, and the surface roughness in μm of the surface of the support having the magnetic recording layer thereon is $S$ (hereinafter "S-factor") the following relationship (I-1) must satisfied for preventing the noise from exceeding that of a standard tape.

$$S_1 \leq \frac{d + 1.15}{15} \quad (I-1)$$

wherein $S_1$ is the surface roughness in μm of the surface of the non-magnetic flexible support having the magnetic recording layer thereon and $d$ is the thickness in μm of the magnetic recording layer, with the thickness (d) of the magnetic recording layer being about 5 μm or less.

Where the surface roughness of the surface of the support opposite the magnetic recording layer ranges from about 0.2 to 0.5 μm, the travelling properties are good and no scattering, stepping and cinching occur. Outside of this range, the effects of the unevenness of this surface, i.e., the surface opposite the surface on which the magnetic recording layer is provided, are transferred onto the magnetic recording layer when the magnetic recording member is wound in a reel form, which results in a deterioration of the surface properties of the magnetic recording layer.

In the magnetic recording member of the present invention, the surface roughness of the surface of the flexible support having the magnetic recording layer thereon preferably satisfies the above described S-factor and further the surface roughness of the opposite surface to that having the magnetic recording layer thereon has an S-factor satisfying the following relationship (I-2)

$$\frac{d + 1.15}{15} < S_2 \leq 0.8 \quad (I-2)$$

wherein $S_2$ is the surface roughness in μm of the back surface of the non-magnetic support opposite that having the magnetic recording layer thereon and $d$ is as described above. It is more preferred in a magnetic recording member satisfying the above requirements, for the thickness of the magnetic recording layer of the magnetic recording member (d) to be about 5 μm or less, and it is most preferred for the thickness of the magnetic recording layer to range from about 0.5 to 5 μm. The use of a magnetic recording layer having a thickness of more than about 5 μm is not desired since the thickness loss of the signal at the time of recording is significant in high density recording, and since the reduction in out-put is larger when the recording is carried out in increasingly higher frequency regions.

In the present invention, the surface roughness of the support was determined by measuring the disorder in the beat interference figure of the surface using an interference microscope. At the same time, the surface roughness was measured with a needle contact type of surface roughness measuring apparatus such as a Surfcom 3, produced by Tokyo Seimitsu K.K. The agreement in the results obtained using the two methods was good, and the error was within ± 0.01 μm.

The surface of the non-magnetic flexible support used in this invention and having the surface characteristics desired on the surface of the support on which the magnetic recording layer is to be formed can be produced by alkali etching, sandblasting or the like. Alternatively, fillers having an average particle size ranging from about 0.01 to 1 μm can be added in an amount of about 0.01 to 5% by weight, preferably about 0.5 to 5% by weight, based on the total weight of the material used in producing the non-magnetic flexible support during the production of the non-magnetic flexible support to achieve the appropriate surface characteristics. Suitable fillers which can be employed are non-magnetic powders such as silica (silicon dioxide), zinc oxide, kaolin, china clay, aluminum silicate, calcium carbonate, calcium acetate, diatomaceous earth, etc., as described in, e.g., U.S. Pat. No. 3,419,460 and Japanese Patent Application (OPI) No. 28,070/1972.

FIGS. 1 to 6 show the relation between the thickness of the magnetic recording layer of the magnetic recording member according to the present invention (X-axis, unit:μm) and the modulation noise level of 4.9 MHz (Y-axis, unit:dB). In these figures, A, B, C, and D designate magnetic recording members in which flexible supports having surface roughness of 0.06 μm, 0.17 μm, 0.31 μm, and 0.49 μm, respectively, on both surfaces thereof, were used.

On the other hand, E, F, and G are magnetic recording members in which flexible supports each having a surface roughness of 0.06 μm on one surface but with surface roughnesses of 0.20 μm, 0.50 μm, and 0.80 μm, respectively on the other surface were used.

In FIG. 7, the minimum thickness of the magnetic recording layer at which the modulation noise level of the magnetic recording member according to the present invention derived from FIGS. 1 to 3 was ± 0 dB when compared with a standard tape, are plotted. In FIG. 7, the X-axis indicates the surface roughness of the flexible support (S, unit:m) and the Y-axis indicates the thickness of the magnetic recording layer (d, unit:μm).

The use of the support according to the present invention enables the surface properties of the magnetic recording layer to be improved. In particular, the improvement in the surface properties is significant in a magnetic recording member having a thickness of about 5 microns or less. Thus the reduction in the modulation noise level which had been impossible with prior art methods, has been made possible, and high quality magnetic tapes for high density short wave length recording with good S/N ratio, good travelling properties, and less unevenness in winding can be obtained.

The support of the present invention can be subjected to the so-called back coating of the surface opposite to that having the magnetic layer thereon, for the purpose of preventing charging, magnetic print through and so on. Suitable back coating techniques which can be used are described in, for example, U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, and 3,166,688.

A method of producing the magnetic coating composition used in the present invention is described in detail in Japanese Patent Publication Nos. 186/1968, 28043/1972, 28045/1972, 28046/1972, 28048/1972, 31445/1972, U.S. Pat. Nos. 3,366,505, 3,437,510, 3,475,356, 3,499,789, 3,558,492, 3,592,687, 3,597,273, 3,634,137, 3,655,595, 3,781,210 and 3,840,400 etc. The magnetic coating compositions in these patents mainly comprises a ferromagnetic powder, a binder, and a coating solvent, and in addition, the composition can contain additives such as a dispersing agent, a lubricant, an abrasive, an antistatic agent, and the like.

Suitable binders which can be used in the present invention include hitherto known thermoplastic resins, thermosetting resins, and mixtures thereof.

Suitable thermoplastic resins are those resins which have a softening point of about 150° C or less, an average molecular weight of about 10,000 to 200,000, and a degree of polymerization of the order of about 200 to 2,000, e.g., a vinyl chloride-vinyl acetate copolymer, a vinyl chloride-vinylidene chloride, copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a polyvinyl fluoride, a vinylidene chloride-acrylonitrile copolymer, a butadiene-acrylonitrile copolymer, a polyamide resin, polyvinyl butyral, cellulose derivatives such as cellulose acetate butyrate, cellulose diacetate, cellulose triacetate, cellulose propionate, cellulose nitrate, and the like, a styrene-butadiene copolymer, a polyester resin, a chlorovinyl ether-acrylate copolymer, an amino resin, various synthetic rubber based thermoplastic resins, and mixtures thereof.

Suitable examples of these resins which can be used are described in Japanese Patent Publication Nos. 6877/1962, 12528/1964, 19282/164, 5349/1965, 20907/1965, 9463/1966, 14059/1966, 16985/1966, 6428/1967, 11621/1967, 4623/1968, 15206,1968, 2889/1969, 17947/1969, 18232/1969, 14020/1970, 14500/1970, 18573/1972, 22063/1972, 22064/1972, 22068/1972, 22069/1972, 22070/1972, 27886/1973, U.S. Pat. Nos. 3,144,352 2,419,420, 3,499,789, 3,713,887, etc.

Suitable thermosetting resins have a molecular weight of about 200,000 or less as a coating solution, and when heated after coating and drying, the molecular weight becomes infinity due to reactions such as condensation, addition, and the like. Of these resins, preferred resins are those resins which do not soften or melt before the the resin thermally decomposes. Representative examples of these resins are a phenol resin, an epoxy resin, a polyurethane hardening type resin, a urea resin, a melamine resin, an alkyd resin, a silicone resin, an acryl based reactive resin, an epoxy-polyamide resin, a mixture of a high molecular weight polyester resin and an isocyanate prepolymer, a mixture of a methacrylic acid salt copolymer and a diisocyanate prepolymer, a mixture of a polyesterpolyol and a polyisocyanate, a ureaformaldehyde resin, a mixture of a low molecular weight glycol, a high molecular weight diol, and triphenylmethane triisocyanate, a polyamine resin, and mixtures thereof, etc.

Suitable examples of these resins which can be used are described in Japanese Patent Publication Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos. 3,144,353, 3,320,090, 2,437,510, 3,597,273, 3,781,210, 3,781,211, etc.

These binders can be used individually or in combination with each other, and other additives can be added to the binders. The weight ratio of the ferro-magnetic powder to the binder is generally about 100:10 to 100:200. When the proportion of the binder is less than about 10 parts by weight, the ability of the binder to bind the fine ferromatic powder becomes weak, and the ferromagnetic powder tends to come off from the magnetic layer. This leads to the disadvantage that the fine ferromagnetic powder that has come off adheres to the magnetic head, or damages the surface of the magnetic layer. On the other hand, when the proportion of the binder is above about 200 parts by weight, the magnetic flux density of the magnetic layer is reduced because the non-magnetic property of the binder dominates the layer characteristics.

Ferromagnetic fine powders which can be used in the present invention, include those known ferromagnetic fine powders of $\gamma$-Fe$_2$O$_3$, Co-containing $\gamma$-Fe$_2$O$_3$, Fe$_3$O$_4$, Co-containing Fe$_3$O$_4$, a Berthollide compound comprising $\gamma$-Fe$_2$O$_3$ and Fe$_3$O$_4$ (FeO$_x$,4, $1.33 < x < 1.50$), a Berthollide compound comprising Co-containing $\gamma$Fe$_2$O$_3$ and Fe$_3$O$_4$ (FeO$_x$, $1.33 < x < 1.50$), CrO$_2$, a Co-Ni-P alloy, a Co-Ni-Fe alloy, a Co-Ni-Fe-B alloy, an Fe-Ni-Zn alloy, an Fe-Mn-Zn alloy, an Fe-Co-Ni-P alloy, a Ni-Co alloy, and the like. Specific examples of these compounds are described in Japanese Patent Publication Nos. 14090/1969, 18372/1970, 22062/1972, 22513/1972, 28466/1971, 38755/1971, 4286/1972, 12422/1972, 18509/1972, 18573/1972, U.S. Pat. Nos. 3,026,215, 3,031,341, 3,100,194, 3,242,005, 3,089,014, British Patent Nos. 752,659, 782,762, 1,007,323, French Patent No. 1,107,654, West German Patent Application (OLS) No. 1,281,334, etc.

Maghemite ($\gamma$-Fe$_2$O$_3$) and magnetite (Fe$_3$O$_4$) can be used as the iron oxide, but Berthollide iron oxide (FeO$_x$ where x is the oxidation degree) (which is disclosed in Japanese Patent Publication Nos. 5,009/64, 10,307/64 and 39,639/73) is especially effective presumably because diffusion of Co into such an oxide is easy. Berthollide iron oxides (FeO$_x$) having an oxidation degree, as defined by the following relationship, of about 15 to 90% are especially effective.

$$\text{Degree of Oxidation} = 1 - \frac{300 - y}{100 - y} \cdot R$$

wherein $\gamma$ represents the divalent atomic percent of metal ions other than Fe$^{++}$, and R is the ratio of Fe$^{++}$/Fe$^{++}$/ + Fe$^{+++}$.

In the above-described Berthollide iron oxide, x ranges from more than 1.33 to less than 1.50, preferably 1.36 to 1.49. The Berthollide iron oxide is produced by following processes.

a. A reduction of maghemite (FeO$_x$, x = 1.50) to magnetite (FeO$_x$, x = 1.33) where the reduction is stopped when $1.33 < x < 1.50$ as set forth in Japanese Patent Publication Nos. 5,009/64 and 39,639/73.

b. An oxidation process of magnetite to maghemite where the oxidation is stopped when $1.33 < x < 1.50$ as described in Japanese Patent Publication Nos. 5,009/64 and 10,307/64. Berthollide iron oxide produced by processes as described above is an iron oxide having an oxidation degree between that of magnetite (Fe$_3$O$_4$:FeO$_x$, x = 1.33) and the maghemite ($\gamma$-Fe$_2$O$_3$:FeO$_x$, x = 1.50), and having a very high coercive force, decreased electrical resistance, and improved dispersibility in an organic solvent. Thus, the print through effect of a recorded signal to another magnetic recording layer is decreased. On the other hand, maghemite and magnetite can be used in combination, and the characteristics thereof are similar but not superior to those of the above-described Berthollide iron oxide.

The particle size of these ferromagnetic powders is about 0.2 to 2 $\mu$m in length and about 1:1 to 20:1 in length to width ratio. When the particle size is larger than about 2 $\mu$m, the magnetization unit increases, and the resulting magnetic recording material becomes unsuitable for high density recording. Furthermore, it is difficult to obtain a magnetic layer with a smooth surface using such a particle size.

In addition to the above described binder and ferromagnetic fine powder, additives such as a dispersing agent, a lubricant, an abrasive, an antistatic agent, and the like can be used in the magnetic recording layer.

Suitable dispersing agents are fatty acids containing about 12 to 18 carbon atoms (e.g., having the formula R$_1$COOH wherein R$_1$ is an alkyl group containing about 11 to 17 carbon atoms), e.g., caprylic acid, capric acid, lauric acid, myristic acid, palmitic acid, stearic acid, oleic acid, elaidic acid, linolic acid, linolenic acid, stearolic acid, and the like; metallic soaps comprising the alkali metal (Li, Na, K, etc.) salts or the alkaline earth metal (Mg, Ca, Ba, etc.) salts of the above described fatty acids; and lecithin, etc. In addition, higher alcohols containing about 12 or more carbon atoms and the sulfates thereof can be used. These dispersing agents are generally employed in a proportion of about 0.5 to 20 parts by weight per 100 parts by weight of the binder. Suitable dispersing agents are described in Japanese Patent Publication Nos. 28,369/64, 17,945/69 and 15,001/73 and U.S. Pat. Nos. 3,387,993 and 3,470,021.

Suitable lubricants which can be used include silicone oils, graphite, molybdenum disulfide, tungsten disulfide, fatty acid esters produced from a monocarboxylic acid containing about 12 to 16 carbon atoms and a monovalent alcohol containing about 3 to 12 carbon atoms, fatty acid esters produced from a monocarboxylic fatty acid containing about 17 or more carbon atoms and a monovalent alcohol, in which the total number of carbon atoms ranges from about 15 to 28, and the like. These lubricants are generally used in a proportion of about 0.2 to 20 parts by weight per 100 parts by weight of the binder. These lubricants are described in Japanese Patent Publication No. 23889/1968, Japanese Patent Application Nos. 28647/1967, 81543/1968, U.S. Pat. Nos. 3,470,021, 3,492,235, 3,497,411, 3,523,086, 3,625,760, 3,630,772, 3,634,253, 3,642,539, 3,687,725, *IBM Technical Disclosure Bulletin*, Vol. 9, No. 7, page 779 (December 1966), *ELEKTRONIK*, No. 12, page 380 (1961), etc.

Typical abrasive agents which can be used include materials generally used, e.g., fused alumina, silicon carbide, chromium oxide, corundum, synthetic corundum, diamond, synthetic diamond, garnet, emery (main component: corundum and magnetite), and the like. Those abrasive agents are used which have an average particle size of about 0.05 to 5 $\mu$m, preferably about 0.1 to 2 $\mu$m. These abrasive agents are generally used in a proportion of from about 0.5 to 20 parts by weight per 100 parts by weight of the binder. These abrasive agents are described in Japanese Patent Application No. 26749/1973, U.S. Pat. Nos. 3,007,807, 3,041,196, 3,293,066, 3,630,910, 3,687,725, British Patent No. 1,145,349, West German Patent (DT-PS) No. 853,211, etc.

Antistatic agents which can be used in the present invention, include inorganic materials such as carbon black and organic materials, for example, natural surface active agents such as saponin; nonionic surface active agents such as alkyleneoxide based, glycerin based, glycidol based surface active agents, and the like; cationic surface active agents such as heterocyclic compounds, e.g., higher alkylamines, quaternary ammonium salts, pyridine, and the like, phosphoniums, sulfoniums, and the like; anionic surface active agents containing acid groups such as carboxylic acid groups, sulfonic acid groups, phosphoric acid groups, sulfate groups, phophate groups, and the like; amphoteric surface active agents such as sulfates or phosphates of amino acids, amino sulfonic acids, and amino alcohols, and the like; etc. A suitable amount of the inorganic material is about 5% by weight and of the organic material is about 0.5 to 1% by weight, each based on the weight of the ferromagnetic material.

Examples of the surface active agents that can be used as antistatic agents, are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, 3,545,974, West German Patent Application (OLS) No. 1,942,665, British Patent Nos. 1,077,317, 1,198,450, Ryohei Oda, et al. Kaimen Kassei Zai no Gosei to so no Oyo (Synthesis of Surface Active Agents and Their Applications, Maki Shoten, Tokyo (1964), A. M. Schwartz et al *Surface Active Agents* Interscience Publications Corp. (1958), J. P. Sisley et al. *Encyclopedia of Surface Active Agents*, Vol. 2, Chemical Publishing Co. (1964), *Kaimen Kassei Zai Binran* (Handbook of Surface Active Agents), 6th Ed., Sangyo Tosho Co., Dec. 20, 1966, etc.

These surface active agents can be used individually or in combination with each other. These surface active agents are generally used as antistatic agents, but in some cases, they are used for other purposes, for example for improving dispersibility, magnetic properties, and lubricity, or as auxiliary coating agents.

The magnetic recording layer is formed by dissolving or dispersing the above described composition in an organic solvent and then coating the resulting solution on a support.

The non-magnetic support can have a thickness of about 3 to 50 μm, preferably 10 to 40 μm. If the thickness is less than about 3 μm, the tensile strength of the support required as a magnetic recording material decreases, and the support tends to break or deform. If the thickness exceeds about 50 μm, the volume and weight of the magnetic recording material increase, and therefore, the recording density per unit volume or weight decreases. Suitable materials which can be used for producing the support, are polyesters such as polyethylene terephthalate, polyethylene-2,6-naphthalate, and the like, polyolefins such as polypropylene, and the like, cellulose derivatives such as cellulose triacetate, cellulose diacetate, and the like, polycarbonates, etc.

The magnetic recording layer can be coated on the support using coating methods such as air doctor coating, blade coating, air knife coating, squeeze coating, dip coating, reverse roll coating, transfer roll coating, gravure coating, kiss coating, cast coating, spray coating, and the like, and other methods can be also used. These methods are described in *Coating Kogaku (Coating Engineering)*, pages 253 to 277, published by Asakura Shoten (March 20, 1971).

Typical organic solvents which can be used in the present invention include ketones, e.g., acetone, methyl ethyl ketone, methyl isobutyl ketone, cyclohexanone, and the like; alcohols, e.g., methanol, ethanol, propanol, butanol, and the like; esters, e.g., methyl acetate, ethyl acetate, butyl acetate, ethyl lactate, glycol monoethyl ether acetate, and the like; ethers and glycol ethers, e.g., diethyl ether, glycol monoethyl ether, glycol dimethyl ether, dioxane, and the like; aromatic hydrocarbons, e.g., benzene, toluene, xylene, and the like; chlorinated hydrocarbons, e.g., methylene chloride, ethylene chloride, carbon tetrachloride, chloroform, ethylene chlorohydrin, dichlorobenzene, and the like, etc., and these solvents can be used individually or in combination with each other.

The magnetic layer coated on the support by the above method is dried after, if desired, the coating has been subjected to a treatment for orienting the magnetic powder in the layer. Suitable treatments for orienting the magnetic powder in the layer are disclosed in U.S. Pat. Nos. 1,949,840, 2,796,359, 3,001,891, 3,172,776, 3,416,949, 3,473,960, and 3,681,138; Japanese Patent Publication Nos. 3427/1957, 28368/1964, 23624/1965, 23625/1965; 13181/1966, 13043/1973 and 39722/1973. If required, the magnetic layer can be subjected to a surface-smoothening treatment, or cut to the desired shape, thereby to form the magnetic recording material of this invention. Suitable surface-smoothening techniques are disclosed U.S. Pat. Nos. 2,688,567, 2,998,325, and 3,783,023, and German Patent Application (OPI) No. 2,405,222.

In the above orienting treatment for the magnetic layer, the orienting magnetic field can be either an AC or DC magnetic field with a field strength of about 500 to 2000 gauss. The drying temperature can range from about 50° to about 100° C, and the drying time is about 3 to 10 minutes.

In the surface-smoothening treatment of the magnetic layer, preferably a calendering method is used in which the magnetic layer is passed between a metal roll and a non-metallic roll while the layer is heated under pressure. A combination of a metal roll and a roll made of cotton and a combination of a metal roll and a roll made of a synthetic resin are especially preferred. The pressure used in this treatment is about 25 to 500 Kg/cm, and the surface temperature of the metal roll is kept at about 35° to 150° C. The rate of the treatment is about 5 to 120 meters/min. When the pressure and temperature are below the lower limits of the above-specified ranges, the effect of the surface-smoothening treatment is difficult to achieve. Pressures and temperatures higher than the upper limits of the above specified ranges are not preferred because the support of the magnetic recording material is deformed. When the treating rate is less than about 5 meters/min. the operating efficiency is low, and if the rate is above about 120 meters/min., the operation is difficult.

The present invention will be explained in detail with reference to the following examples. It will be obvious to one skilled in the art that various changes and modifications can be made in the components, ratios, operational order, and the like without departing from the spirit of the present invention. Therefore the present invention should not be construed as being limited to the following examples.

All parts, percents, ratios and the like are by weight unless otherwise indicated.

EXAMPLE 1

| | Parts |
|---|---|
| Fine particles of Co-Fe (3:7) Alloy (axis ratio = 1:9, average width = 200 A, Hc = 950 Oe) | 300 |
| Polyester-Polyurethane (molecular weight: about 4,000,000; reaction product of a polyester comprising butanediol and adipic acid, and containing terminal hydroxy groups, and 2,4-diphenylmethane diisocyanate) | |

-continued

| | Parts |
|---|---|
| | 30 |
| Synthetic Nondrying Oil-modified Alkyd Resin (oil length 25%; Burnock DE-241-70, produced by Japan Reichhold Co.) | 35 |
| Silicone Oil (dimethyl polysiloxane | 2 |
| Butyl Acetate | 250 |
| Methyl Isobutyl Ketone | 450 |

The above components were placed in a ball mill, and kneaded for 20 hours. Then 22 parts of an isocyanate compound (75% by weight ethyl acetate solution of a reaction product of b 3 moles of 2,4-tolylenediisocyante and 1 mole of trimethylpropane Desmodur L-75 produced by Bayer A. G.) was added, and the resulting mixture was dispersed under high speed shearing whereby a magnetic coating composition was obtained.

This magnetic coating composition was coated on a 22 μm thick polyethylene terephthalate support having the surface roughness shown in Table 1 in the thickness shown in Table 1, and oriented in a DC magnetic field of 1,000 Oe. After drying, these supports were super calender roll processed and slit to a ½ inch width whereby video tapes were obtained. With these video tapes, the noise level was measured, and the results so obtained are shown in Table 1.

Table 1

| Sample | Surface Roughness of Support (μm) | Thickness of Magnetic Recording Layer (μm) | 4.9 MHz Noise Level* (dB) |
|---|---|---|---|
| A | 0.06 (both surfaces) | 0.5 | +1.1 |
| | | 1.1 | +0.9 |
| | | 1.9 | −0.3 |
| | | 3.2 | +0.2 |
| | | 4.0 | ±0.0 |
| | | 5.2 | −0.1 |
| B | 0.17 (both surfaces) | 1.0 | +3.6 |
| | | 2.1 | +1.3 |
| | | 3.1 | −0.1 |
| | | 4.2 | −0.3 |
| | | 5.3 | +0.2 |
| | | 7.0 | +0.0 |
| C | 0.31 (both surfaces) | 1.0 | +15.9 |
| | | 1.8 | +13.3 |
| | | 3.2 | +7.4 |
| | | 4.3 | +1.3 |
| | | 5.1 | +1.0 |
| | | 7.2 | +0.0 (standard) |
| D | 0.49 (both surfaces) | 3.0 | +16.1 |
| | | 4.9 | +10.2 |
| | | 6.9 | +3.7 |
| | | 9.2 | +0.6 |
| | | 11.4 | −0.3 |

*The measurement was carried out using the tape in which the surface roughness of the support was 0.31 μm on both surfaces and the thickness of the magnetic layer was 7.2 μm as a standard.

EXAMPLE 2

| | Parts |
|---|---|
| CrO₂ (axis ratio 1:7 mean length of long axis = 0.6 m, Hc = 540 Oe) | 300 |
| Copolymer of Vinyl Chloride and Vinylidene Chloride (monomer molar ratio 7:3; degree of polymerization: 400) | 27 |
| Epoxy Resin (reaction product of bisphenol A and epichlorohydrin; molecular weight about 900; epoxy equivalent: 450 to 500; hydroxy group content: 0.29%; Epikote 1001 produced by Shell Oil Co.) | 28 |
| Silicone Oil (as described in Example 1) | 3 |
| Butyl Acetate | 700 |

The above components were charged in a ball mill and dispersed for 24 hours. Then 14 parts of Desmodur L-75 (as described in Example 1) was added, and the resulting mixture was dispersed under high speed shearing whereby a magnetic coating composition was obtained.

This coating composition was coated on a 22 μm thick polyethylene terephthalate support in the thickness shown in Table 2 and oriented in the same manner as in Example 1. This support was super calender processed and slit to a ½ inch width whereby video tapes were obtained. With these video tapes, the noise level was measured. The results obtained are shown in Table 2.

Table 2

| Sample | Surface Roughness of Support (μm) | Thickness of Magnetic Recording Layer (μm) | 4.9 MHz Noise Level* (dm) |
|---|---|---|---|
| A | 0.06 (both surfaces) | 0.6 | +1.5 |
| | | 1.2 | +0.9 |
| | | 2.1 | ±0.0 |
| | | 3.0 | +0.1 |
| | | 4.3 | −0.1 |
| | | 5.1 | −0.2 |
| B | 0.17 (both surfaces) | 1.1 | +2.9 |
| | | 1.9 | +0.6 |
| | | 3.3 | ±0.0 |
| | | 4.1 | −0.2 |
| | | 5.0 | ±0.0 |
| | | 7.2 | −0.1 |
| C | 0.31 (both surfaces) | 1.0 | +13.3 |
| | | 1.9 | +6.9 |
| | | 3.1 | +1.4 |
| | | 4.1 | +0.3 |
| | | 5.2 | ±0.0 |
| | | 7.0 | ±0.0 (standard) |
| D | 0.49 (both surfaces) | 3.2 | ±13.1 |
| | | 4.8 | +3.9 |
| | | 7.1 | +0.4 |
| | | 9.3 | ±0.0 |
| | | 10.9 | +0.1 |

*The measurement was carried out using the tape in which the support surface roughness was 0.31 μm and the magnetic layer had a thickness of 7.0 μm as a standard.

EXAMPLE 3

| | Parts |
|---|---|
| Co-containing Fe₃O₄ (axis ratio = 1:5, mean length of long axis = 0.5 μm, Hc = 610 Oe) | 300 |
| Copolymer of Vinyl Chloride and Vinylidene Chloride (monomer molar ratio: ratio:7:3; degree of polymerization:400) | 45 |
| Urethane Prepolymer (containing terminal NCO groups; NCO group content:4.42 to 4.67 %; viscosity at 25° C:90,000 to 130,000 cps; amine equivalent:900 to 950; Takenate L-1007 produced by Takeda Yakuhin K.K.) | 25 |
| Silicone Oil (as described in Example 1) | 4 |
| Butyl Acetate | 850 |

The above components were charged in a ball mill and dispersed for 24 hours. Then 20 parts of Desmodur L-75 (as described in Example 1) was added, and the resulting mixture was dispersed under high speed shearing for 2 hours whereby a magnetic coating composition was obtained.

In the same manner as in Example 1, this coating composition was coated on a 22 μm thick polyethylene terephthalate support in the thicknesses as shown in Table 3 and oriented, and this support was super calender roll processed and cut to a ½ inch width whereby video tapes were obtained. With the video tapes, the noise level was measured, and the results obtained are shown in Table 3 together with surface roughnesses of the support.

Table 3

| Sample | Surface Roughness of Support (μm) | Thickness of Magnetic Recording Layer (μm) | 4.9 MHz Noise Level* (dB) |
| --- | --- | --- | --- |
| A | 0.06 (both surfaces) | 0.6 | +1.9 |
|   |   | 1.0 | +0.3 |
|   |   | 2.1 | −0.1 |
|   |   | 3.1 | −0.2 |
|   |   | 4.3 | +0.1 |
|   |   | 5.3 | −0.1 |
| B | 0.17 (both surfaces) | 0.9 | +3.7 |
|   |   | 2.1 | +1.2 |
|   |   | 3.0 | +0.4 |
|   |   | 4.1 | ±0.0 |
|   |   | 5.2 | −0.2 |
|   |   | 7.1 | −0.1 |
| C | 0.31 (both surfaces) | 1.2 | +11.2 |
|   |   | 2.3 | +4.7 |
|   |   | 3.1 | +2.6 |
|   |   | 4.0 | +0.5 |
|   |   | 5.1 | +0.3 |
|   |   | 7.1 | ±0.0 (standard) |
| D | 0.49 (both surfaces) | 3.1 | +12.5 |
|   |   | 4.8 | +2.3 |
|   |   | 7.1 | +0.7 |
|   |   | 9.1 | ±0.0 |
|   |   | 11.2 | +0.2 |

*The measurement was carried out using the tape in which the support surface roughness was 0.31 μm and the thickness of the magnetic layer was 7.1 μm as a standard.

EXAMPLE 4

A magnetic coating composition prepared in the same manner as described in Example 1 was coated on one surface of a 22 μm thick polyethylene terephthalate support (this surface was designated as the A surface and the opposite surface as the B surface) in the thicknesses shown in Table 4. In the same manner as described in Example 1, video tapes were obtained, and with these video tapes, the noise level was measured. The results obtained are shown in Table 4.

Table 4

| Sample | Surface Roughness of Support A surface (μm) | Surface Roughness of Support B surface (μm) | Thickness of Magnetic Recording Layer (μm) | 4.9 MHz Noise Level* (dB) |
| --- | --- | --- | --- | --- |
| E | 0.06 | 0.20 | 0.5 | +1.2 |
|   |   |   | 1.0 | +0.9 |
|   |   |   | 2.0 | +0.2 |
|   |   |   | 3.1 | +0.1 |
|   |   |   | 4.1 | ±0.0 |
|   |   |   | 5.2 | −0.2 |
| F | 0.06 | 0.50 | 0.5 | +1.5 |
|   |   |   | 1.1 | +1.2 |
|   |   |   | 2.2 | +0.6 |
|   |   |   | 3.1 | +0.2 |
|   |   |   | 4.2 | ±0.0 |
|   |   |   | 5.1 | −0.1 |
| G | 0.06 | 0.80 | 0.6 | +5.6 |
|   |   |   | 1.1 | +4.7 |
|   |   |   | 2.1 | +3.9 |
|   |   |   | 3.0 | +3.0 |
|   |   |   | 4.1 | +2.9 |
|   |   |   | 5.0 | +2.6 |

*The measurement was carried out using the tape of Example 1, in which the surface roughness was 0.31 μm (both surfaces) and in which the thickness of the layer was 7.2 μm as a standard.

EXAMPLE 5

A magnetic coating composition prepared in the same manner as in Example 2 was coated on one surface of a 22 μm thick polyethylene terephthalate support (this surface was designated as Surface A and the opposite surface as Surface B) in the thicknesses shown in Table 5. In the same manner as in Example 1, video tapes were produced, and with these video tapes, the noise level was measured. The results obtained are shown in Table 5.

Table 5

| Sample | Surface Roughness of Support A surface (μm) | Surface Roughness of Support B surface (μm) | Thickness of Magnetic Recording Layer (μm) | 4.9 MHz Noise Level* (dB) |
| --- | --- | --- | --- | --- |
| E | 0.06 | 0.20 | 0.5 | +1.6 |
|   |   |   | 1.1 | +1.0 |
|   |   |   | 2.0 | +0.3 |
|   |   |   | 3.3 | +0.1 |
|   |   |   | 4.2 | ±0.0 |
|   |   |   | 5.1 | −0.2 |
| F | 0.06 | 0.50 | 0.6 | +1.8 |
|   |   |   | 1.0 | +1.2 |
|   |   |   | 2.1 | +0.4 |
|   |   |   | 3.2 | +0.2 |
|   |   |   | 4.1 | ±0.0 (standard) |
|   |   |   | 5.1 | −0.2 |
| G | 0.06 | 0.80 | 0.5 | +4.8 |
|   |   |   | 1.0 | +3.8 |
|   |   |   | 2.0 | +2.8 |
|   |   |   | 3.1 | +2.4 |
|   |   |   | 4.0 | +2.2 |
|   |   |   | 5.2 | +2.2 |

*The measurement was carried out using the tape of Example 2 in which the support surface roughness of both surface was 0.31 μm and in which the thickness of the magnetic layer was 7.0 μm as a standard.

EXAMPLE 6

A magnetic coating composition prepared in the same method as described in Example 3 was coated on one side of a 22 μm thick polyethylene terephthalate support (this surface was designated as Surface A and the opposite surface as Surface B) in the thicknesses shown in Table 6. In the same manner as in Example 1, video tapes were obtained. With these video tapes, the noise level was measured and the results so obtained are shown in Table 6.

Table 6

| Sample | Surface Roughness of Support A surface | Surface Roughness of Support B surface | Thickness of Magnetic Recording Layer (μm) | 4.9 MHz Noise Level* (dB) |
| --- | --- | --- | --- | --- |
| E | 0.06 | 0.20 | 0.5 | +2.0 |
|   |   |   | 0.9 | +1.2 |
|   |   |   | 2.1 | +0.4 |
|   |   |   | 3.1 | +0.2 |
|   |   |   | 4.2 | +0.1 |
|   |   |   | 5.3 | −0.1 |
| F | 0.06 | 0.50 | 0.6 | +2.1 |
|   |   |   | 1.0 | +1.3 |
|   |   |   | 2.0 | +0.5 |
|   |   |   | 3.2 | +0.3 |
|   |   |   | 4.0 | +0.1 |
|   |   |   | 5.1 | −0.1 |
| G | 0.06 | 0.80 | 0.5 | +4.5 |
|   |   |   | 1.0 | +3.3 |
|   |   |   | 2.0 | +2.8 |
|   |   |   | 3.2 | +2.3 |
|   |   |   | 4.1 | +2.2 |
|   |   |   | 5.2 | +2.0 |

*The measurement was carried out using the tape of Example 3 in which the support surface roughness was 0.31 μm and in which the thickness of the magnetic layer was 7.1 μm as a standard.

In these 22 μm thick polyethylene terephthalate supports used in Examples 1, 2, 3, 4, 5, and 6, the surface roughness was varied by adding fillers or by changing the amount of the filler to be added. The method of producing these supports is described in Japanese Patent Application (OPI) no. 49892/1973.

The modulation noise level in Tables, 1, 2, 3, and 4 was determined by measuring the noise level which was modulated to 4.9 MHz when a 5 MHz base signal was recorded. In this case, the noise wave length at 4.9 MHz was 0.1 MHz and the wave length on the tape was 110 μm. It can be therefore considered that this noise is caused by the surface roughness of the support having a cycle of not less than 50 μm.

The surface roughness of the web was determined by measuring the disorder in the beat interference figure of the surface using an interference microscope, and at the same time, the surface roughness was measured with a needle contact type of surface roughness measuring apparatus. The error was ± 0.01 μm. The thickness of the magnetic recording layer was measured with a needle contact type thickness measuring apparatus. The error was ± 0.05 μm.

FIGS. 1 to 6 grahpically represent the results shown in Tables 1 to 6 of Examples 1 to 3. In the figures, the X-axis indicates the thickness (in μm) of the magnetic recording layer and the Y-axis indicates the 4.4 MHz modulation noise level (in dB).

In these FIGS. A, B, C, and D designate the magnetic recording members in which flexible supports having surface roughnesses of 0.06 μm, 0.17 μm, 0.31 μm and 0.49 μm, respectively, of both surfaces were used.

E, F, and G designate the magnetic recording members in which flexible supports each having a surface roughness of 0.06 μm on the surface on which the magnetic recording layer was provided, and surface roughnesses of 0.20 μm, 0.50 μm, and 0.80 μm, respectively, on the opposite surface were used.

FIG. 7 indicates the minimum magnetic thicknesses (d) in μm necessary for the modulation noise level to become ±0 decibel as compared with the standard tape, derived from FIGS. 1 to 3. In this figure, the X-axis indicates the surface roughness of the flexible support (S; unit: μm) and the Y-axis indicates the thickness (d) in μm of the magnetic recording layer. The straight line indicates the correlation between S and d. The correlation coefficient is 0.98 and the correlation is represented by the relationship:

$$S_1 = \frac{d - 0.4}{18.9}$$

Thus, the Area S in this figure separated by this straight line satisfies the S factor, i.e., Area S indicates the area where the modulation noise is small whereas Area N fails to satisfy the S factor, i.e., Area N indicates the area where the modulation noise is large.

Investigations on the modulation noise level of magnetic recording members produced by providing magnetic recording layers having various thicknesses on flexible supports having different surface roughnesses on the basis of Tables 1 to 4 and the corresponding FIGS. 1 to 4, have revealed that the modulation noise level increases as the coating thickness decreases and the modulation noise level increases as the surface roughness of the flexible support increases.

From the results in Tables 1 to 3, it has been found that the relation between the surface roughness of the flexible support, i.e., S and the minimum thickness of the magnetic layer, i.e., d, at the time that the modulation noise level of the magnetic recording member is the same as that of the standard tape, is represented by the following relationship at the correlation coefficient of 0.98:

$$S_1 = \frac{d - 0.4}{18.9}$$

Accordingly, in order to obtain a magnetic recording member which has a lower noise level than the standard and has high quality, it is necessary to satisfy the following relationship (II-1), i.e., S factor:

$$S_1 \leq \frac{d - 0.4}{18.9} \quad \text{(II-1)}$$

Furthermore, these magnetic recording members satisfying the following equation (I-1) are suitable from a practical standpoint.

$$S_1 \leq \frac{d + 1.15}{15} \quad \text{(I-1)}$$

It has been found, however, that with these magnetic recording members satisfying the following relationship:

$$S_1 > \frac{d + 1.15}{15}$$

the noise level suddenly increases.

It has been found from the results in Tables 3 to 5 and FIGS. 3 to 5 that where a flexible support is used whose surface properties of the surface having the magnetic recording layer thereon, are different from those of the surface without the magnetic layer, the modulation noise level varies depending on the surface properties of the surface of the support having the magnetic recording layer thereon, provided that the surface roughness of the surface of the support without the magnetic recording layer, does not exceed about 0.8 μm. This phenomenon has been found to be due to the fact that if the surface roughness of the surface of the support without the magnetic recording layer, exceeds about 0.8 μm, the unevenness of the back of the support is transferred to the magnetic recording layer when the tape is wound on a reel. Where the surface roughness is not more than about 0.5 μm, however, no transfer was detected.

On the other hand, where magnetic recording members comprising flexible supports of A to G are travelled, the more uneven are the surface properties of the surface of the flexible support without the magnetic recording layer, the better are the travelling properties, and unevenness in winding, and so on were not been detected. However, when the surface roughness of the surface of the support without the magnetic recording layer would be more than 0.8 μm, it is not desirable since the unevenness of the back of the support is transfered to the magnetic recording layer when the tape is wound on a reel. Therefore, this transfered roughness causes a noise and makes the noise level (4.9 MHz) extremely high. Further, this transfered roughness of the surface of the magnetic recording layer causes a poor contact between the magnetic head and the tape, and in consequence the sensitivity of recording is described.

It was also found that the magnetic recording members should preferably satisfy the relationship between the surface roughness of the support without the magnetic recording layer, i.e., $S_2$, and the thicknes of the magnetic layer, i.e., as expressed by the following relationship (II-2)

$$\frac{d - 0.4}{18.9} < S_2 \leq 0.5 \tag{II-2}$$

Further, those magnetic recording members satisfying the following relationship (I-2) are suitable from a practical standpoint.

$$\frac{d + 1.15}{15} < S_2 \leq 0.8 \tag{I-2}$$

It is to be noted that the surface roughness of the hitherto used flexible supports of high density recording members is not less than about 0.3 μm, which is the same with the surface roughness of the surface of flexible supports having the magnetic recording layer thereon, this surface and the opposite surface of the flexible supports having different surface roughnesses. Moreover, the thickness of the magnetic recording layer has been generally not less than about 5 μm.

Therefore, if a particularly thin magnetic recording layer having a thickness of about 5 μm or less is coated on hitherto used supports having a surface roughness of 0.3 μm, an increase in the modulation noise level greatly influencing the video S/N ratio inevitably takes place. Thus it has been confirmed that only by the use of flexible supports with the low surface roughness of the present invention can magnetic recording members be obtained which have a small modulation noise level, good travelling properties, and less scattering, stepping and cinching.

While the invention has been described in detail and with reference to specific embodiments thereof, it will be apparent to one skilled in the art that various changes and modifications can be made therein without departing from the spirit and scope thereof.

What is claimed is:

1. A magnetic recording material comprising a non-magnetic flexible support up to 50 μm thick having thereon a magnetic recording layer comprising a ferromagnetic powder dispersed in a binder, the surface of said non-magnetic flexible support having the magnetic recording layer thereon satisfying an S-factor expressed by the following relationship (I-1)

$$S_1 \leq \frac{d + 1.15}{15} \tag{I-1}$$

wherein $S_1$ is the surface roughness in μm of the surface of the non-magnetic flexible support having the magnetic recording layer thereon and d is the thickness in μm of the magnetic recording layer, with the thickness (d) of the magnetic recording layer being about 3 μm or less, and the back surface of said non-magnetic flexible support opposite that having said magnetic recording layer thereon satisfying an S-factor expressed by the following relationship (I-2).

$$\frac{d + 1.15}{15} < S_2 \leq 0.8 \tag{I-2}$$

wherein $S_2$ is the surface roughness in μm of the back surface of the non-magnetic support opposite that having said magnetic recording layer thereon and d is as described above.

2. The magnetic recording material of claim 1, wherein the S-factor for the surface of said non-magnetic support having said magnetic recording layers thereon is expressed by the relationship (II-1), $$S_1 \leq \frac{d - 0.4}{18.9} \tag{II-1}$$

and the S-factor for the back surface of said non-magnetic support is expressed by the relationship (II-2).

$$\frac{d - 0.4}{18.9} < S_2 \leq 0.5 \tag{II-2}$$

wherein $S_1$, $S_2$ and d are as defined in claim 1.

3. The magnetic recording material of claim 1, wherein said ferromagnetic powder is at least one member selected from the group consisting of a ferromagnetic alloy powder, a chromium dioxide powder, a Co-containing $Fe_3O_4$ powder, a Co-containing Berthollide iron oxide, and a Co-containing $\gamma\text{-}Fe_2O_3$.

4. The magnetic recording material of claim 1, wherein said ferromagnetic powder is a ferromagnetic alloy powder.

5. A video tape comprising the magnetic recording material of claim 1.

* * * * *